United States Patent
Iacono

(10) Patent No.: US 11,200,580 B2
(45) Date of Patent: Dec. 14, 2021

(54) SYSTEMS AND METHODS FOR PROVIDING CUSTOMER SUPPORT

(71) Applicant: Dealer On Call LLC, Dover, DE (US)

(72) Inventor: Ignazio Iacono, Staten Island, NY (US)

(73) Assignee: Dealer On Call LLC, Dover, DE (US)

( * ) Notice: Subject to any disclaimer, the term of this patent is extended or adjusted under 35 U.S.C. 154(b) by 318 days.

(21) Appl. No.: 16/268,635

(22) Filed: Feb. 6, 2019

(65) Prior Publication Data
US 2019/0244213 A1 Aug. 8, 2019

Related U.S. Application Data

(60) Provisional application No. 62/626,733, filed on Feb. 6, 2018.

(51) Int. Cl.
H04N 7/14 (2006.01)
G06Q 30/00 (2012.01)
G06Q 10/10 (2012.01)

(52) U.S. Cl.
CPC ....... *G06Q 30/016* (2013.01); *G06Q 10/1095* (2013.01); *H04N 7/147* (2013.01); *H04N 7/14* (2013.01)

(58) Field of Classification Search
CPC .... G06Q 30/016; G06Q 10/1095; H04N 7/14; H04N 7/147; H04N 7/15
USPC ............... 705/304; 348/14.01–14.16
See application file for complete search history.

(56) References Cited

U.S. PATENT DOCUMENTS

| | | |
|---|---|---|
| 4,531,184 A | 7/1985 | Wigan et al. |
| 4,939,509 A | 7/1990 | Bartholomew et al. |
| 5,727,155 A | 3/1998 | Dawson |
| 5,870,547 A | 2/1999 | Pommier et al. |
| 5,974,444 A | 10/1999 | Konrad |
| 6,477,667 B1 | 11/2002 | Levi et al. |
| 7,565,338 B2 | 7/2009 | Beniaminy et al. |
| 7,676,035 B2 | 3/2010 | Werth et al. |
| 7,694,192 B2 | 4/2010 | Bantz et al. |
| 7,861,127 B2 | 12/2010 | Yamashita |
| 7,890,802 B2 | 2/2011 | Gerber |
| 8,341,530 B1 | 12/2012 | Inabinet et al. |
| 8,606,604 B1 * | 12/2013 | Huber .................. G06Q 30/02 705/4 |
| 9,077,736 B2 | 7/2015 | Werth et al. |
| 10,089,633 B2 | 10/2018 | Thiyagarajan et al. |
| 2006/0037072 A1 | 2/2006 | Rao et al. |
| 2006/0277096 A1 | 12/2006 | Levitus |
| 2007/0078697 A1 * | 4/2007 | Nixon .................. G06Q 30/02 705/7.16 |

(Continued)

OTHER PUBLICATIONS

International Search Report and Written Opinion issued for PCT/US2019/016755, dated Apr. 29, 2019, 9 pp.

*Primary Examiner* — Melur Ramakrishnaiah

(74) *Attorney, Agent, or Firm* — Zeller IP Group, PLLC; Kyle M. Zeller

(57) ABSTRACT

The disclosed customer support methods and systems allow customers to request and receive product-specific support from service providers. The embodiments facilitate support interactions between such customers and providers by allowing providers to provide on-demand and/or scheduled support services to customers via various communication channels, displaying product-specific communications and resources to customers, and/or allowing customers and providers to access past support interactions.

20 Claims, 11 Drawing Sheets

(56) References Cited

U.S. PATENT DOCUMENTS

| | | |
|---|---|---|
| 2008/0107094 A1 | 5/2008 | Borella et al. |
| 2008/0215450 A1 | 9/2008 | Gates et al. |
| 2009/0106036 A1* | 4/2009 | Tamura ................. G06Q 10/20 705/305 |
| 2009/0112687 A1 | 4/2009 | Blair et al. |
| 2011/0009707 A1* | 1/2011 | Kaundinya ............ G16H 40/67 600/300 |
| 2011/0072312 A1 | 3/2011 | Fan et al. |
| 2011/0249081 A1 | 10/2011 | Kay et al. |
| 2012/0317487 A1 | 12/2012 | Lieb et al. |
| 2013/0030948 A1 | 1/2013 | Fisher |
| 2013/0147787 A1 | 6/2013 | Ignatchenko et al. |
| 2013/0151999 A1 | 6/2013 | Seul |
| 2013/0218783 A1 | 8/2013 | Anand |
| 2014/0052645 A1 | 2/2014 | Hawes et al. |
| 2014/0222865 A1 | 8/2014 | Casey et al. |
| 2016/0371759 A1* | 12/2016 | Wilson ............... G06Q 30/0627 |
| 2017/0078456 A1 | 3/2017 | Navare et al. |

\* cited by examiner

Customer Registration 300

First Name —301
Last Name —302
Make —311
Model —312
Year —313
Vin Number —314
Dealership —320
Email —331
Password —332

Sign up —340

FIG. 3

Customer Login 400

Email —431
Password —432

☐ Remember account

Login —445

FIG. 4

1300 Provider Registration

First Name —1301
Last Name —1302
Dealership —1321
Role —1322
Dealer Code —1323
Email —1331
Password —1332

[Sign up] —1340

SYSTEMS AND METHODS FOR PROVIDING CUSTOMER SUPPORT

CROSS-REFERENCE TO RELATED APPLICATIONS

The present application claims benefit of U.S. provisional patent application Ser. No. 62/626,733, titled "Systems and Methods for Providing Customer Support," filed Feb. 6, 2018, which is incorporated by reference herein in its entirety.

BACKGROUND

This specification relates generally to customer support software. More specifically, this specification relates to a systems and methods for scheduling and providing product-specific, customer-support interactions.

Automobile customers often purchase vehicles based on the availability of complex electronics and other high-tech features. Although automobile dealerships employ skilled sales associates to explain and demonstrate such features to customers at the time of purchase, many customers decline to engage with these professionals, whether due to time constraints or a misguided belief that they can figure out how to use the features on their own.

Unfortunately, once a customer leaves the point of sale, they often find it difficult or impossible to understand at least some features of their new automobile. Relevant information about such features may be hard to locate in the owner's manual. And it is often difficult for customers to find an appropriate expert who can explain how to use a specific feature via a telephone call. As a result, customers may have to return to the dealership to receive individualized training. Even worse, customers may ignore important features and/or use such features incorrectly, both of which may lead to a dangerous situation.

Accordingly, there remains a need for systems to facilitate remote support interactions between providers (e.g., sales associates and customer service representatives) and customers. It would be beneficial if such systems allowed for seamless customer registration, customer support request management and processing, and on-demand and/or scheduled live video communication between customers and providers.

SUMMARY

In accordance with the foregoing objectives and others, methods, systems and apparatuses, including computer programs encoded on computer storage media, are provided for scheduling and facilitating customer support services.

In one embodiment, a method is provided. The method includes storing, by a server, in a database, a plurality of customers, each customer associated with customer information; storing, by the server, in the database, a plurality of providers, each provider associated with provider information; and receiving, by the server, a demo creation request associated with demo information. The demo information may include, for example, a selected customer from the plurality of customers; a selected provider from the plurality of providers; and a selected date/time. The method may further include creating, by the server, a demo event including the demo information; storing, by the server, in the database, the demo event; transmitting, by the server, to a provider device associated with the selected provider, the demo event; and transmitting, by the server, to a client device associated with the selected customer, the demo event. The method may also include transmitting, by the server, to the provider device, a demo notification before the selected date/time; receiving, by the server, from a confirmed provider (e.g., the selected provider or a different provider of the plurality of providers), a demo confirmation; and connecting, by the server, the confirmed provider to the selected customer at the selected date/time to thereby facilitate a live video call between the confirmed provider and the selected customer.

In another embodiment, a system is provided that includes a plurality of client devices, each device associated with one of a plurality of customers; a plurality of provider devices, each device associated with one of a plurality of providers; and a server in communication with the plurality of client devices and the plurality of provider devices via a network. The server may include a memory and a processor. The memory may store customer information associated with each of the plurality of customers and/or provider information associated with each of the plurality of providers. Generally, the processor may be adapted to receive a demo creation request associated with demo information, such as a selected customer from the plurality of customers, a selected provider from the plurality of providers; and a selected date/time. The processor may be further adapted to create a demo event associated with the demo information; transmit the demo event to a selected provider device associated with the selected provider; transmit the demo event to a selected client device associated with the selected customer; transmit a demo notification to the selected provider device before the selected date/time; receive a demo confirmation from the selected provider device; and/or connect the selected provider device to the selected client device (e.g., via the network) to thereby facilitate a live video call between the selected provider and the selected customer.

In the above embodiment, the processor of the server may be further adapted to receive a first rescheduling request from the selected provider device, wherein the first rescheduling request includes an updated date/time; and update the selected date/time associated with the demo event to the updated date/time before said transmitting the demo event to the selected client device. The processor may also be adapted to receive a second rescheduling request from the selected client device, wherein the second rescheduling request includes a second updated date/time; update the selected date/time associated with the demo event to the second updated date/time; and/or provide the demo event to the selected provider device.

Additionally or alternatively, the processor may be adapted to receive, from the selected provider device, a video feed captured by a camera of the selected provider device; and transmit the video feed to the selected client device. A recording of the video feed may be created by the processor, and such recording may be stored in the memory and/or transmitted to the selected client device and/or any number of provider devices.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 shows an exemplary customer registration screen 300 for a customer support application embodiment.

FIG. 4 shows an exemplary customer login screen 400 of the customer support application embodiment.

DETAILED DESCRIPTION

Various methods and systems are disclosed to allow customers to request and receive product-specific support from product manufacturers, sales departments, dealerships, and other customer-facing professionals (individually and collectively referred to herein as "providers"). Exemplary software systems, devices, and user interfaces ("UIs") described herein may be used to: facilitate support interactions between such customers and providers by allowing providers to provide on-demand and/or scheduled support services, provide OEM product-specific communications and resources to customers, and/or allow customers and providers to access past interactions. Unlike conventional customer-support and customer relationship management ("CRM") software, the disclosed embodiments allow providers and customers to converge on specific concerns and feedback without the need for in-person interaction.

Figure 1:
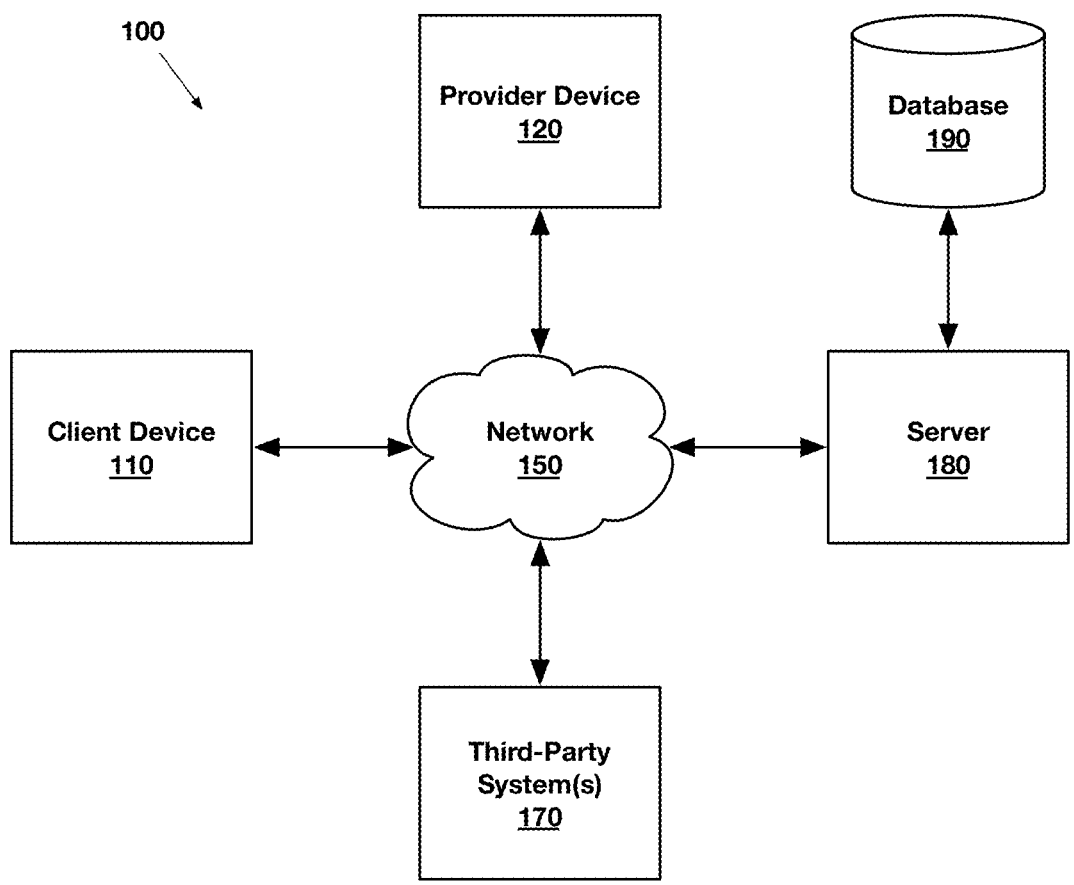
FIG. 1 shows a block diagram of an exemplary customer support system 100 for facilitating interactions between providers and customers.

Referring to FIG. 1, an exemplary customer support system 100 is illustrated. As shown, the system 100 comprises one or more client devices 110, one or more provider devices 120, one or more third-party systems 170, and a server 180 connected to a database 190. Generally, each of the system components may be in communication with a network 150 (e.g., Internet, intranet, local-area network ("LAN"), wide-area network ("WAN"), cellular, etc.).

Each client device 110 may be operated by an individual, such as customers of an automobile dealership wishing to receive assistance. Similarly, each provider device 120 may be operated by an individual, such as dealership associates servicing one or more customers and/or other providers. As discussed below, each of the client devices 110 and provider devices 120 may comprise any device capable of accessing the server 180 (e.g., via the network 150), such as by running a client application or other software, like a web browser or web-browser-like application. Exemplary client devices 110 and provider devices 120 include, but are not limited to, general-purpose computers, special-purpose computers, desktop workstations, laptops, tablets, smartphones, personal digital assistants ("PDAs"), smart devices (e.g., televisions), wearable devices, and the like.

The server 180 may be adapted to receive, determine, record and/or transmit customer information for any number of customers and provider information for any number of providers. Such information may be manually entered or selected by a user via an online, mobile, or desktop client application running on a client device 110 or provider device 120. Such information may additionally or alternatively be automatically received from any of such devices. The server 180 may store received and/or determined information in, for example, a database 190.

Notification information, such as notification events and/or notification content, may also be stored in the database 190. The system may be adapted to provide notifications to customers (e.g., via a client device 110) and/or providers (e.g., via a provider device 120). Generally, the system is configured to automatically transmit notifications to users based on predefined, rule-based events stored in the database 190. Such notifications may be in the form of a visual alert, an audio alert, or a message (e.g., a push message, an SMS message or email) sent to a client device 110 and/or provider device 120.

In one embodiment, the server 180 may be connected to one or more third-party systems 170 via the network 150. Such third-party systems 170 may store information in one or more databases that may be accessed by the server 180. Third-party systems 170 may include, but are not limited to, CRM systems (e.g., HUB SPOT, SALESFORCE, etc.), contact management systems, communication systems, scheduling systems, and others. The server 180 may be capable of retrieving and/or storing information from third-party systems 170, with or without user interaction. Moreover, the server 180 may be capable of transmitting stored information to third-party systems 170, and may notify users of such communications.

Figure 2:
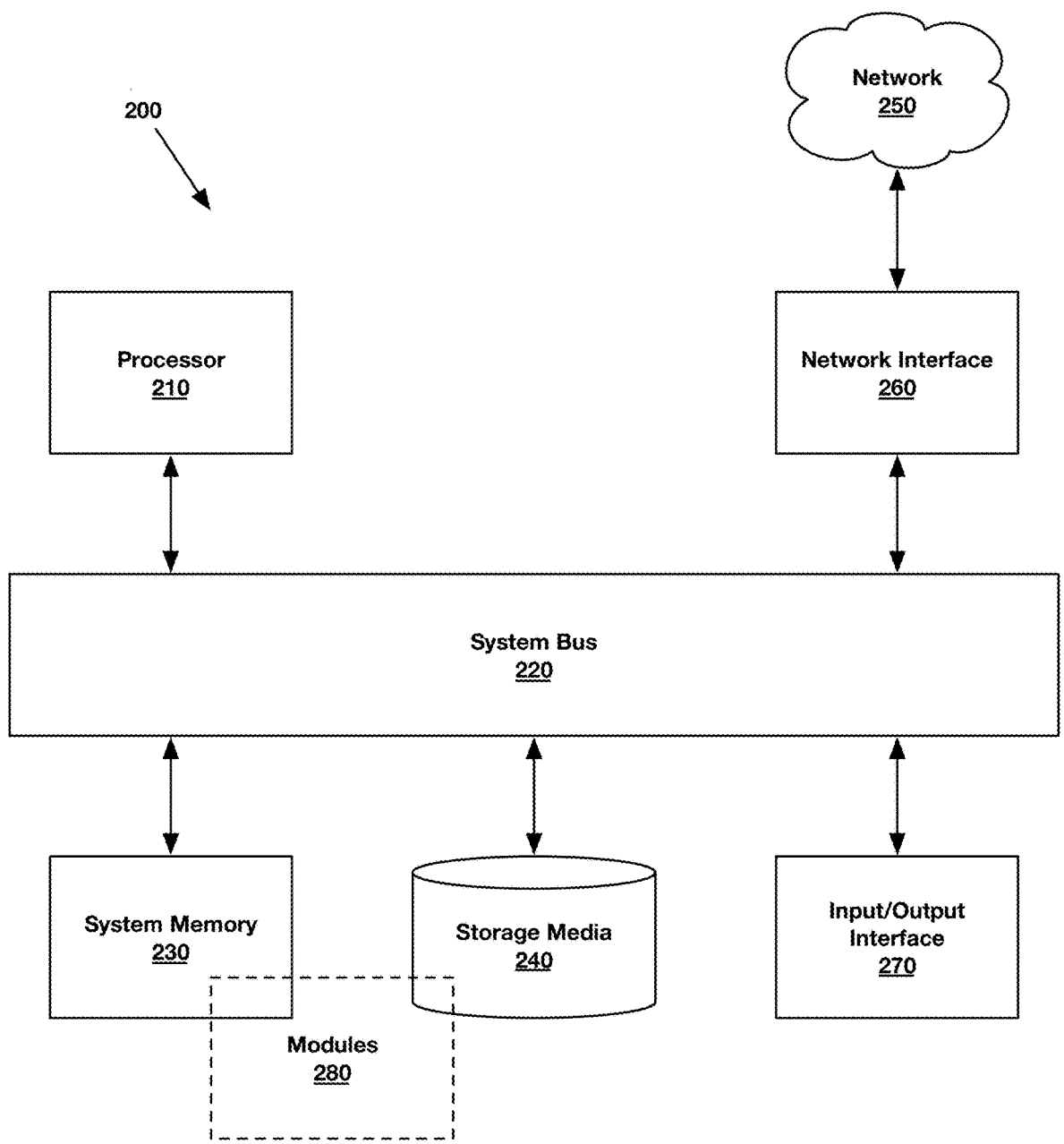
FIG. 2 shows a block diagram of an exemplary server 200 for use in a customer support system.

Referring to FIG. 2, a block diagram is provided illustrating a server 200 and modules 220 in accordance with one or more embodiments presented herein. The server 200 may correspond to any of the various computers, servers, mobile devices, embedded systems, or computing systems presented herein. The modules 230 may comprise one or more hardware or software elements configured to facilitate the server 200 in performing the various methods and processing functions presented herein.

As shown, the server 200 may include various internal and/or attached components such as processor 210, system bus 270, system memory 220, storage media 240, input/output interface 280, and network interface 260 for communicating with a network 250. The server 200 may be implemented as a conventional computer system, an embedded controller, a laptop, a server, a mobile device, a smartphone, a set-top box, over-the-top content TV ("OTT TV"), Internet Protocol television ("IPTV"), a kiosk, one more processors associated with a television, a customized machine, any other hardware platform and/or combinations thereof. And, in some embodiments, the server 200 may be a distributed system configured to function using multiple servers interconnected via a data network or bus system 270.

The processor 210 may be configured to execute code or instructions to perform the operations and functionality described herein, manage request flow and address mappings, and to perform calculations and generate commands. The processor 210 may be configured to monitor and control the operation of the components in the server 200. The processor 210 may be a general-purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 210 may be a single processing unit, multiple processing units, a single processing core, multiple processing cores, special purpose processing cores, coprocessors, or any combination thereof. According to certain embodiments, the processor and/or other components of the server may be a virtualized server executing within one or more other servers.

The system memory 220 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 220 also may include volatile memories, such as random-access memory ("RAM"), static random-access memory ("SRAM"), dynamic random-access memory ("DRAM"), and synchronous dynamic random-access memory ("SDRAM"). Other types of RAM also may be used to implement the system memory. The system memory 220 may be implemented using a single memory module or multiple memory modules. While the system memory is depicted as being part of the server 200, one skilled in the art will recognize that the system memory may be separate from the server without departing from the scope of the subject technology. It should also be appreciated that the system memory may include, or operate in conjunction with, a non-volatile storage device such as the storage media 240.

The storage media 240 may include a hard disk, a compact disc read only memory ("CD-ROM"), a digital versatile disc ("DVD"), a Blu-ray disc, a magnetic tape, a flash memory, other non-volatile memory device, a solid-state drive ("SSD"), any magnetic storage device, any optical storage device, any electrical storage device, any semiconductor storage device, any physical-based storage device, any other data storage device, or any combination or multiplicity thereof. The storage media 240 may store one or more operating systems, application programs and program modules such as module, data, or any other information. The storage media may be part of, or connected to, the server 200. The storage media may also be part of one or more other servers that are in communication with the server such as other computers, database servers, cloud storage, network attached storage, and so forth.

The modules 230 may comprise one or more hardware or software elements configured to facilitate the server 200 with performing the various methods and processing functions presented herein. The modules 230 may include one or more sequences of instructions stored as software or firmware in association with the system memory 220, the storage media 240, or both. The storage media 240 may therefore represent examples of machine or computer readable media on which instructions or code may be stored for execution by the processor. Machine or computer readable media may generally refer to any medium or media used to provide instructions to the processor. Such machine or computer readable media associated with the modules may comprise a computer software product. It should be appreciated that a computer software product comprising the modules may also be associated with one or more processes or methods for delivering the module to the server via the network, any signal-bearing medium, or any other communication or delivery technology. The modules 230 may also comprise hardware circuits or information for configuring hardware circuits such as microcode or configuration information for an FPGA or other PLD.

The input/output ("I/O") interface 280 may be configured to couple to one or more external devices, to receive data from the one or more external devices, and to send data to the one or more external devices. Such external devices along with the various internal devices may also be known as peripheral devices. The I/O interface 280 may include both electrical and physical connections for operably coupling the various peripheral devices to the server 200 or the processor 210. The I/O interface 280 may be configured to communicate data, addresses, and control signals between the peripheral devices, the server, or the processor. The I/O interface 880 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface may be configured to implement only one interface or bus technology. Alternatively, the I/O interface may be configured to implement multiple interfaces or bus technologies. The I/O interface 280 may be configured as part of, all of, or to operate in conjunction with, the system bus 270. The I/O interface 280 may include one or more buffers for buffering transmissions between one or more external devices, internal devices, the server 200, or the processor 210.

The I/O interface 280 may couple the server 200 to various input devices including mice, touch-screens, scanners, biometric readers, electronic digitizers, sensors, receivers, touchpads, trackballs, cameras, microphones, keyboards, any other pointing devices, or any combinations thereof.

The I/O interface 280 may also couple the server 200 to various output devices including video displays, speakers, printers, projectors, tactile feedback devices, automation control, robotic components, actuators, motors, fans, solenoids, valves, pumps, transmitters, signal emitters, lights, and so forth. Exemplary display devices include, but are not limited to one or more of: projectors, cathode ray tube ("CRT") displays, liquid crystal displays ("LCD"), light-emitting diode ("LED") displays and/or organic light-emitting diode ("OLED") displays.

The server 200 may operate in a networked environment using logical connections through the network interface 260 to one or more other systems or servers 200 across the network 250. The network 250 may include WANs, LANs, intranets, the Internet, wireless access networks, wired networks, mobile networks, telephone networks, optical networks, or combinations thereof. The network 250 may be packet switched, circuit switched, of any topology, and may use any communication protocol. Communication links within the network 250 may involve various digital or an analog communication media such as fiber optic cables, free-space optics, waveguides, electrical conductors, wireless links, antennas, radio-frequency communications, and so forth.

The processor 210 may be connected to the other elements of the server 200 or the various peripherals discussed herein through the system bus 270. It should be appreciated that the system bus 270 may be within the processor, outside the processor, or both. According to some embodiments, any of the processor 210, the other elements of the server 200, or the various peripherals discussed herein may be integrated into a single device such as a system on chip ("SOC"), system on package ("SOP"), or ASIC device.

In one embodiment, the server 200 may engage in communication with a user device (e.g., a client device and/or a provider device) via a web browser or similar client application running on the user device. For example, a client application running on a user device may make a request for a specific resource using HTTP/HTTPS and the server may respond with the content of that resource or an error message if unable to do so. The resource may be data or a file stored in a database. The server can receive content from a user, possibly using HTTP/HTTPS.

Generally, a client application may be adapted to present various user interfaces to users. Each client application may comprise HTML data, images, videos, icons, and/or executable code. The executable code may be composed in JavaScript, ECMAScript, coffeescript, python, Ruby or any other programming languages suitable for execution within the cooking application or for translation into an executable form.

In one embodiment, communication between a client application and the server may involve the use of a translation and/or serialization module. A serialization module can convert an object from an in-memory representation to a serialized representation suitable for transmission via HTTP or another transport mechanism. For example, the serialization module may convert data from a native Python, Ruby, or Java in-memory representation into a JSON string for communication over the client-to-server transport protocol. After the JSON string is received by the receiver, a de-serialization module may convert the JSON string back into the native Python, Ruby, or Java in-memory representation for use by the client application or the patient monitoring and management application.

It will be apparent to one of ordinary skill in the art that, in certain embodiments, any of the functionality of the server may be incorporated into a client, and vice versa. Likewise, any functionality of a client application may be incorporated into a browser-based client, and such embodiments are intended to be fully within the scope of this disclosure. For example, a browser-based client application could be configured for offline work by adding local storage capability, and a native application could be distributed for various native platforms via a software layer that executes the browser-based program on the native platform.

Before a user may access the one or more modules 280, the user may be required to register with the server 200. In one embodiment, the user may log in through an application executed by a user device (e.g., a client device and/or a provider device) or through a web application accessible via a browser executed by such devices.

Referring to FIG. 3, an exemplary customer registration screen 300 of a client application is illustrated. As shown, the customer registration screen may prompt a user of a user device to input customer information. Exemplary customer information may comprise customer identification information (e.g., first name 301, last name 302, age, date of birth, sex, unique ID, photo, etc.); contact information (e.g., email address 331, physical address, phone number, etc.); billing information (e.g., credit card information, billing address, etc.); product information (e.g., vehicle make 311, model 312, year 313, and VIN number 314); preferred service provider information 320 (e.g., name, location, branch, unique code, etc.); and/or a password 332.

Upon entering customer information, the user may select a sign up option 340 to complete the registration process. Generally, inputted customer information may be received by the server and stored in a database connected thereto.

Referring to FIG. 4, an exemplary login screen 400 of the client application is illustrated. As shown, registered users may sign into the client application by entering login information, such as an email address 431 and a password 432.

Figures 5, 6:
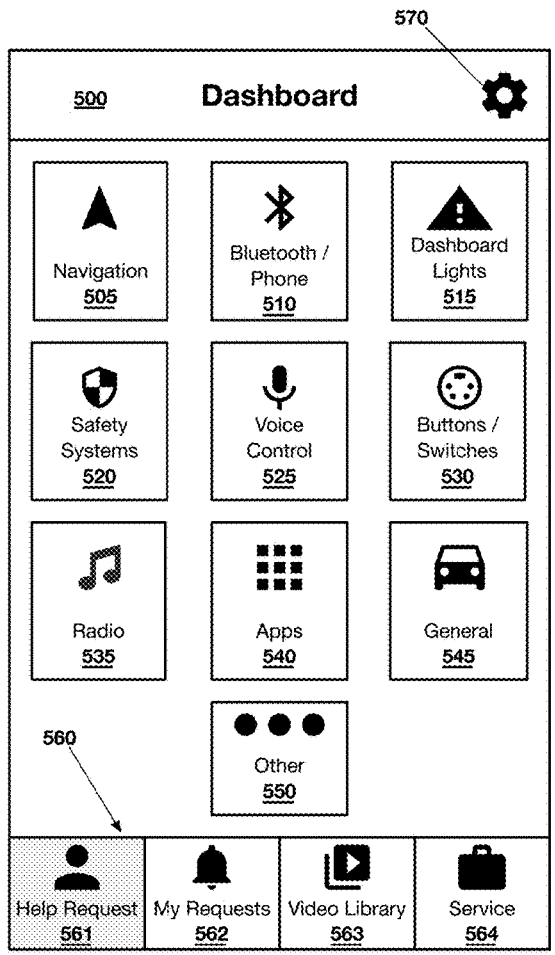
FIG. 5 shows an exemplary dashboard screen 500 of the customer support application embodiment.
FIG. 6 shows an exemplary customer profile screen 600 of the customer support application embodiment.

Referring to FIG. 5, an exemplary dashboard screen 500 of the client application is illustrated. As shown, this screen 500 may display a number of selectable help categories 505-550 from which a user may choose. Exemplary help categories include, but are not limited to, navigation 505, Bluetooth/phone 510, dashboard lights 515, safety systems 520, voice commands 525, buttons/switches 530, radio 535, in-vehicle apps 540, general overview 545 and/or others 550.

Generally, a user may select one of the displayed categories 505-550 in order to request assistance relating the selected category from the user's preferred service provider. As discussed below, upon receiving a category selection, the system may display a help request creation screen (FIG. 7 at 700) to the user and such screen may be customized based on the selection.

In certain embodiments, the displayed categories 505-550 may be customized based on any product information associated with a user's account. For example, the dashboard screen 500 may display a navigation category 505 to a first user who is associated with a first vehicle that includes a navigation system. And the dashboard screen 500 may not display the navigation category 505 to a second user who is associated with a second vehicle that does not include a navigation system.

The dashboard screen 500 may further comprise a navigation menu 560 that includes links to various user interface screens of the client application. As shown, the navigation menu 560 may comprise: a link 561 to the dashboard screen 500, a link 562 to a customer help requests list screen (FIG. 9 at 900), a link 563 to a video library screen (FIG. 11 at 1100), and/or a link 564 to a service information screen (FIG. 12 at 1200).

Referring to FIG. 6, an exemplary profile screen 600 of the client application is illustrated. In certain embodiments, a user may access this screen 600 by selecting a link or other icon 570 present in FIG. 5.

As shown, the profile screen 600 allows a user to view, create, update, and/or delete customer information (e.g., first name 601, last name 602, email address 631, and/or password 632, vehicle make 611, model 612, year 613, and/or a preferred service provider 620). If a customer modifies any of such information, they may select a save option 641 to save the modified information to the server. Inputted information may be received by the server and stored in a database connected thereto.

Figure 7:
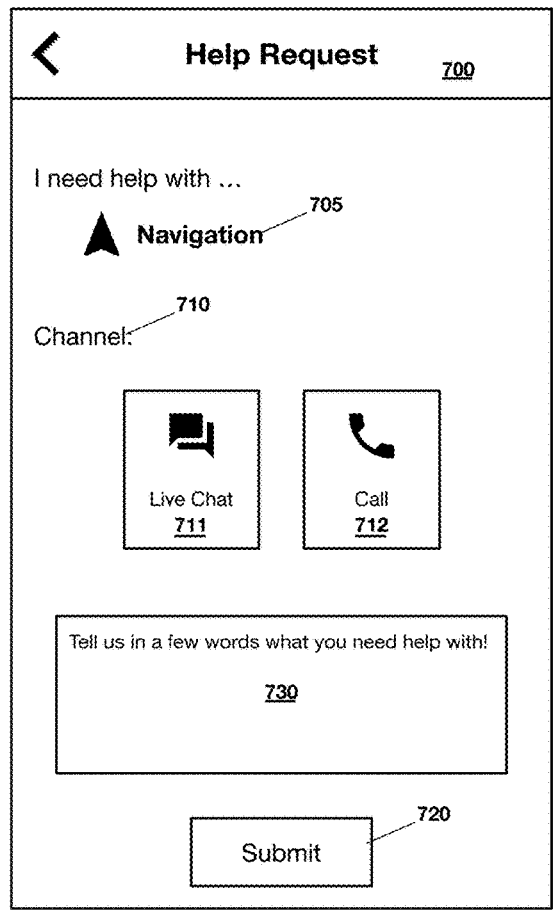
FIG. 7 shows an exemplary customer help request creation screen 700 of the customer support application embodiment.

Referring to FIG. 7, an exemplary help request creation screen 700 of the client application is illustrated. Generally, this screen 700 allows a user to request assistance from a service provider via creation of a help request comprising help request information. Exemplary help request information may include, but is not limited to: any customer information associated with the customer (e.g., identification information, contact information, billing information, product information, preferred service provider information, etc.), a help category 705, a preferred mode of communication 710, and/or any additional information 730.

In one embodiment, a user may access the help request creation screen 700 by selecting one of the categories 505-550 displayed in FIG. 5, and the help category 705 may be prepopulated with the selected category. For example, the illustrated embodiment displays a navigation category 705 corresponding to a user's previous selection of the navigation category 505 displayed on the dashboard screen 500. In other embodiments, the customer may select the help category 705 from a list of available help categories.

In one embodiment, the help request creation screen 700 may display a number of available modes of communication 710 to the customer (e.g., live text-based chat 711, phone call 712, video call, etc.). Accordingly, the user may select one of the available communication modes to associate the same with the help request.

This screen 700 may further display an input field 730 to allow the customer to input additional information relating to their help request. For example, the customer may enter a description of any problems they are experiencing into the additional information input field 730.

Once the customer has finished entering help request information, they may select the submit link 720 to transmit the same to the server. And, as discussed in detail below, upon receiving help request information from a client device, the server may store such information in a database and/or transmit such information to any number of provider devices.

Figure 8:
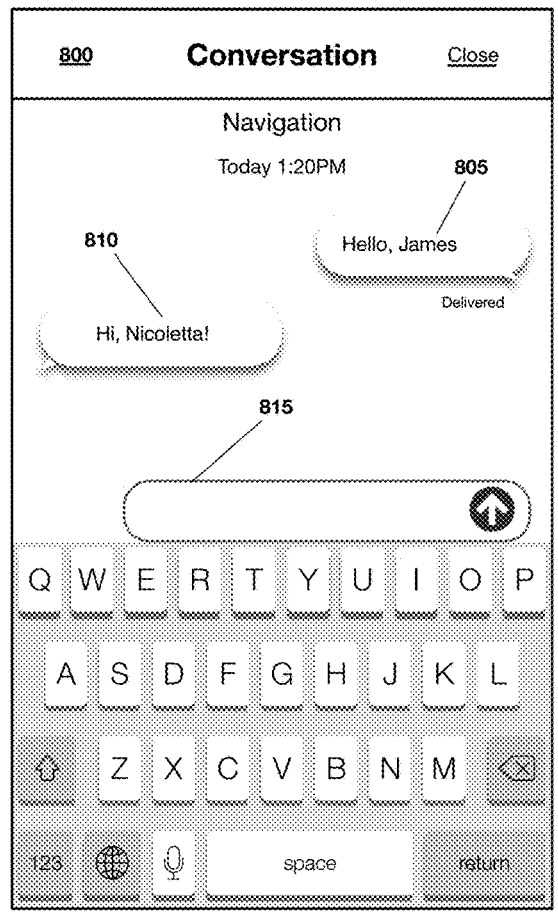
FIG. 8 shows an exemplary chat assistance screen 800 of the customer support application embodiment.

Referring to FIG. 8, an exemplary chat assistance screen 800 is illustrated. As shown, the chat assistance screen 800 allows a customer 805 and a provider 810 to engage in asynchronous communication (e.g., text messaging), which may be ideal in low-bandwidth situations or if the help request involves general information.

In one embodiment, the chat assistance screen 800 displays an input box 815. The customer 805 or the provider 810 may input a message into the input box 815 in order to send the same to the other party.

In certain embodiments, the chat assistance screen 800 may be adapted to retain and display historical messages exchanged between the parties. This allows for important messages to be referenced by the customer 805 and/or the provider 810 at a later time.

Figure 9:
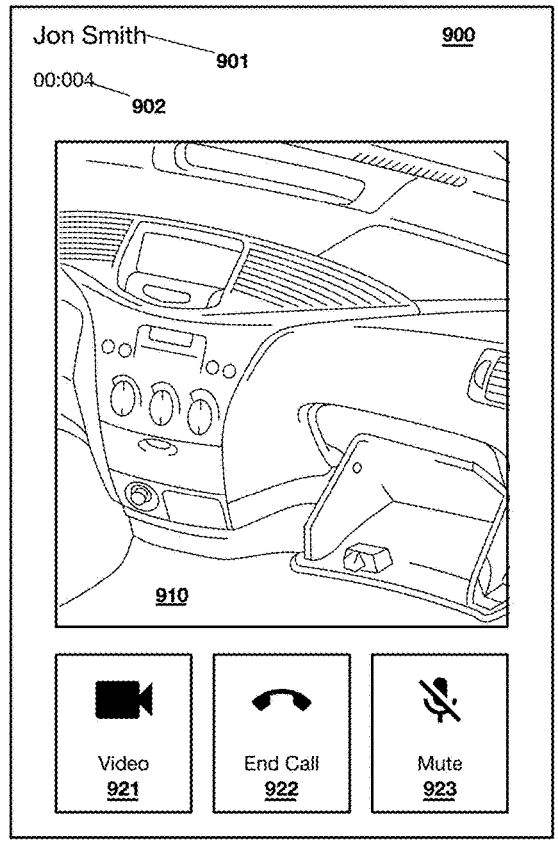
FIG. 9 shows an exemplary communications 900 of the customer support application embodiment.

Referring to FIG. 9, an exemplary communication screen 900 of the client application is illustrated. Generally, the communication screen 900 provides functionality to allow customers and providers to communicate via various methods, such as but not limited to, a conventional phone call, a voice-over-internet-protocol ("VOIP") call, a live video call and/or screen share.

As shown, the communication screen 900 may display a name 901 of the other party or parties with whom a call is being conducted, a duration of the call 902, an option 922 to end the call, and an option 923 to turn on/off a microphone of the device. In one embodiment, a call may be placed directly via the client application and/or via a dedicated phone application in communication with the client application.

Generally, the communication screen 900 and associated functionality may be employed for live video calls, video demonstrations, screen shares, or any other actions involving video of any kind. As shown, this screen 900 may display a live video feed 910 to all call participants, wherein the live video feed is captured by a camera associated with one of the call participant's devices and is transmitted from such device to all other participants' devices.

Unlike conventional video-call software, the communication screen 900 allows only one of the call participants to transmit a live video feed 910 at a time. This reduces complexity, as the single live video feed 910 is displayed to all call participants, and such feed is the only video feed displayed on the participants' screens at any given time. Because only one of the participants may transmit a live video feed at a time, the communication screen 900 may comprise an option 921 to allow other participants to "take over" control of the live video feed. Upon selecting this option 921, the displayed live video feed 910 may switch from a first live video feed transmitted by a first participant (e.g., a service provider), to a second live video feed transmitted by a second participant (e.g., a customer). It will be appreciated that the first participant may then resume transmitting the first live video at a later time by selecting the option 921 (which will cause transmission of the second feed to end).

In certain embodiments, the communication screen 900 may not allow a video feed to be captured via a device's front-facing camera for privacy reasons. In such cases, a participant may only capture/view/transmit a live video feed 910 using a rear-facing camera of their device.

Figure 10:
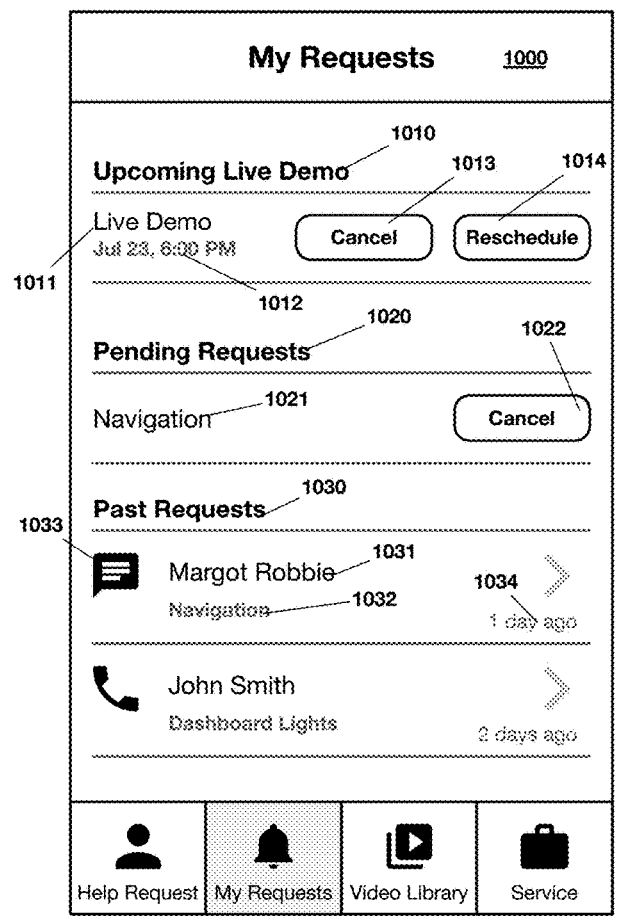
FIG. 10 shows an exemplary customer help requests list screen 1000 of the customer support application embodiment.

Referring to FIG. 10, an exemplary customer help requests list screen 1000 is illustrated. As shown, this screen 1000 may allow a customer to view information relating to scheduled live video demonstrations (i.e., "demos") 1010, pending help requests 1020, and/or past help requests 1030. In one embodiment, this screen 1000 may be accessed by, for example, selecting the "My Requests" link 562 in FIG. 5.

In one embodiment, the customer help requests list screen 1000 may display information relating to any number of upcoming demos 1010 scheduled by a provider. For example, the application may display a name and/or description 1011 of an upcoming demo and a date/time 1012 when the demo is scheduled to be conducted.

A demo may generally comprise an in-app, live video chat between any number of providers and any number of customers. During a typical demo, a provider may provide a detailed product demonstration to the customer and/or may answer any number of the customer's questions. In certain embodiments, a video recording of each demo may be automatically recorded and stored in a memory of the client device, provider device and/or server such that the recording may be accessed at a later time.

This screen 1000 may also provide options to cancel 1013 and/or reschedule 1014 upcoming demos 1011. For example, upon selecting a reschedule option 1014, a demo rescheduling popup or modal may be displayed, which allows a customer to request a different date and/or time for the associated demo 1011. Upon selecting a modified date/time, a demo modification request may be transmitted to the server. And, upon receiving a confirmation (e.g., from the provider or a different provider), the scheduled demo 1011 may be displayed via the customer help requests list screen 1000 with the new date/time 1012. Scheduling of demos is discussed in detail below in reference to FIG. 19.

In one embodiment, the customer help requests list screen 1000 may also display information and options relating to any number of pending help requests 1020 (e.g., navigation help request 1021). For example, an option to cancel 1022 a pending help request 1021 may be displayed.

In another embodiment, the customer help requests list screen 1000 may display information and options relating to any number of past help requests 1030. For example, each past request may be displayed along with an associated provider 1031 who addressed to the request, a category 1032 associated with the request, a communication mode 1033 associated with the request, and a time period 1034 since the last communication relating to the request occurred. In certain embodiments, a user may select one of the displayed past requests to view any communications and/or recorded videos associated therewith.

Figure 11:
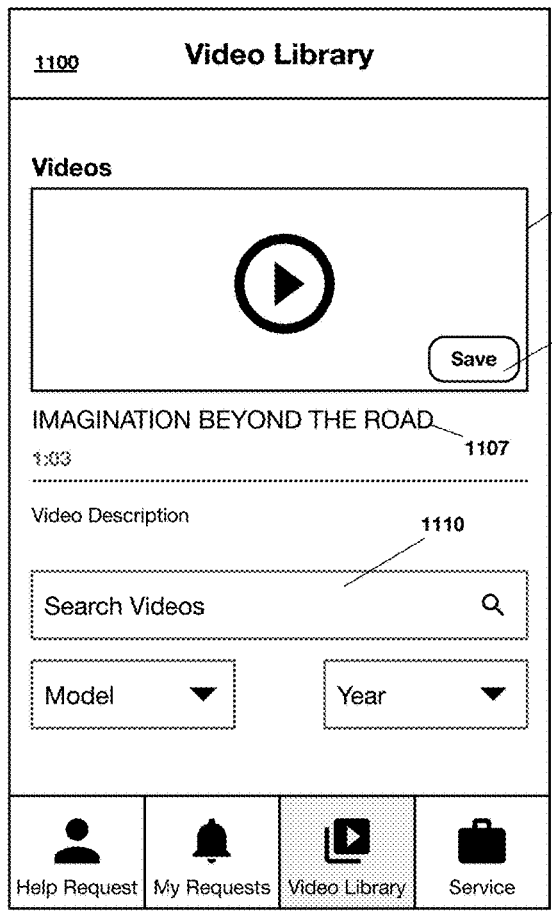
FIG. 11 shows an exemplary video library screen 1100 of the customer support application embodiment.
Figure 12:
FIG. 12 shows an exemplary service information screen 1200 of the customer support application embodiment.

Referring to FIG. 11, an exemplary video library screen 1100 of the client application is illustrated. The video library screen 1100 may be accessed by, for example, selecting the video library link 563 in FIG. 5.

The video library screen 1100 may allow a user to search videos through a search form 1110 using any combination of keywords or product-specific categories (e.g., vehicle make, model, year, maintenance milestone, etc.). Selecting a video through the video library screen 1100 may display the video 1105 and provide a save link 1106 to store the video in a memory internal to the device (e.g., client device, provider device).

In certain embodiments, the video library screen 1100 may be adapted to display recordings of any completed demos. As discussed above, recordings may be automatically created for each demo, and such recordings may be archived in, for example, a database, a memory internal to the server (e.g., system memory, storage media) or a memory internal to a user device (e.g., client device, provider device). Such recordings may be opened and viewed via the video library screen, as desired by a user.

Referring to FIG. 12, an exemplary service information screen 1200 is illustrated. This screen 1200 may be accessed by, for example, selecting the "Service" link 564 in FIG. 5.

As shown, the service information screen 1200 may display various information relating to a customer's preferred service provider. For example, this screen 1200 may display a service provider's name 1201, hours of operation 1210, address 1202, and/or contact information 1203.

The screen 1200 may also provide various options to contact or visit the preferred service provider 1201. A call option 1222 may be displayed to allow the customer to initiate a phone call to the service provider. An email option 1223 may be displayed to allow the customer to compose an email to an email address associated with the service provider. And a directions option 1221 may be displayed to allow the customer to view turn-by-turn directions to the service provider. Additionally or alternatively, the service scheduling screen 1200 may allow the customer to schedule a service appointment with the service provider 1201.

It will be appreciated that any information displayed via the service information screen 1200 may be filtered, determined and/or customized based on a preferred service provider and/or any product information associated with a customer's account. For example, the screen 1200 may display maintenance schedules, maintenance reminders, and/or product recalls for a customer's associated vehicle(s).

Figures 13, 14:
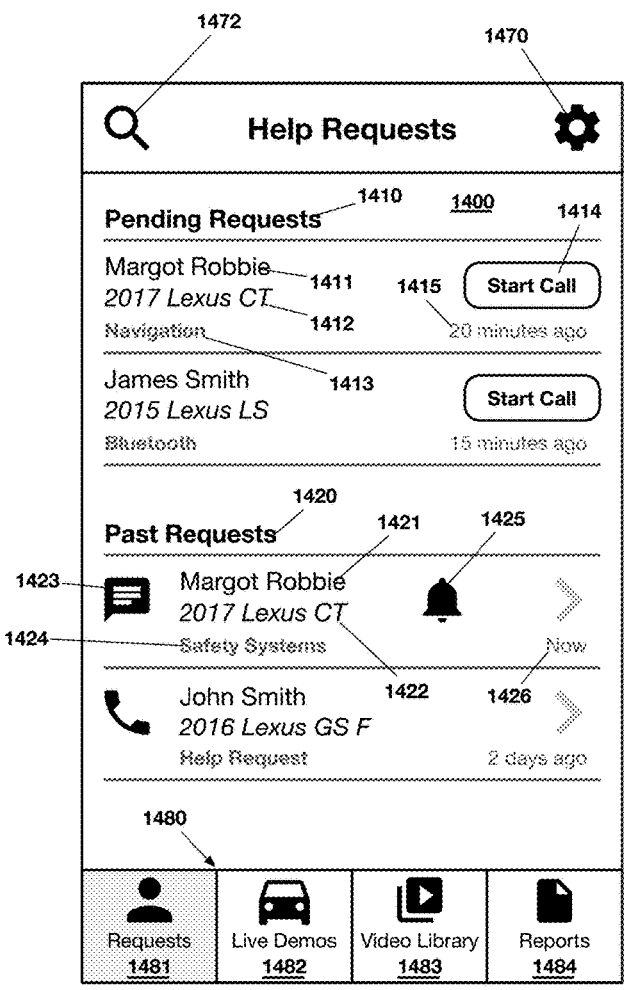
FIG. 13 shows an exemplary provider registration screen 1300 of the customer support application embodiment.
FIG. 14 shows an exemplary provider help requests list screen 1400 of the customer support application embodiment.

Referring to FIG. 13, an exemplary provider registration screen 1300 is illustrated. As shown, the provider registration screen 1300 prompts a user of a provider device to input provider information. Generally, provider information may include, but is not limited to: provider identification information (e.g., first name 1301, last name 1302, associated organization 1321, role 1322, unique code 1323, photo, etc.); contact information (e.g., email address 1331, physical address, phone number, etc.); and/or password 1332.

In one embodiment, selecting a role 1322 through the provider registration screen 1300 may cause a role selection panel to be displayed. The role selection panel may display a list of roles associated with the provider's organization 1321, such that the provider may select one or more of such roles. Exemplary roles may include, but are not limited to, technology specialist, delivery specialist, sales associate, service consultant, sales manager, service manager. In one embodiment, role selection may determine the types of help requests for which the provider is notified (e.g., based on help category or other factors).

Subsequent to registering through the provider registration screen 1300, the provider may proceed to login through a provider login screen (not shown) analogous to the login screen 400 shown in FIG. 4. And registered providers may sign into the provider application by entering login information, such as an email address and password.

Referring to FIG. 14, an exemplary provider help requests list screen 1400 is illustrated. As shown, this screen 1400 may display pending help requests 1410 and/or past help requests 1420 received from various customers. Generally, a received help request may be categorized as "pending help request" until a service provider contacts a customer associated with the request. And a help request may be categorized as a "past help request" after a provider initiates contact with the customer.

In one embodiment, the screen 1400 displays each of the pending help requests 1410 assigned to a provider, along with some or all associated help request information. For example, the illustrated embodiment displays the following help request information for each pending help request 1410: a customer 1411 associated with the request (e.g., customer identification information, such as a name); product information 1412 associated with the customer (e.g., vehicle make, model and year); a help category 1413 associated with the request (e.g., navigation, Bluetooth/phone, etc.); and a time 1415 when the request was received from the customer.

The screen 1400 may also display an option 1414 to initiate communication with the customer associated with a pending help request 1411. It will be appreciated that this option 1414 may allow the provider to select a communication mode (e.g., call or text). Alternatively, this option 1414 may require the provider to contact the customer via a communication mode selected by the customer.

It will be appreciated that a provider assigned to one or more categories (or roles) may be notified of an incoming help request associated with one of those categories. In one embodiment, the provider may confirm his/her availability with the server through the provider device. The server may subsequently add a pending help request to the list of pending help requests 1410. Optionally, the server may also initiate a text chat or direct phone call between the provider and the customer requesting help.

In one embodiment, the screen 1400 may further display each of the provider's past help requests along with associated help request information. For example, the illustrated embodiment displays the following help request information for each past help request 1420: a customer 1421 associated with the request (e.g., customer identification information, such as a name); product information 1422 associated with the customer (e.g., vehicle make, model and year); a mode of communication 1423 associated with the request (e.g., text or call); a help category 1424 associated with the request (e.g., navigation, Bluetooth/phone, etc.); a new message notification 1425 (if applicable); and a time 1426 since last communication with the customer. In certain embodiments, the provider may select one of the displayed past help requests to view previous communications with the associated customer and/or to follow up with the customer.

Figure 16:
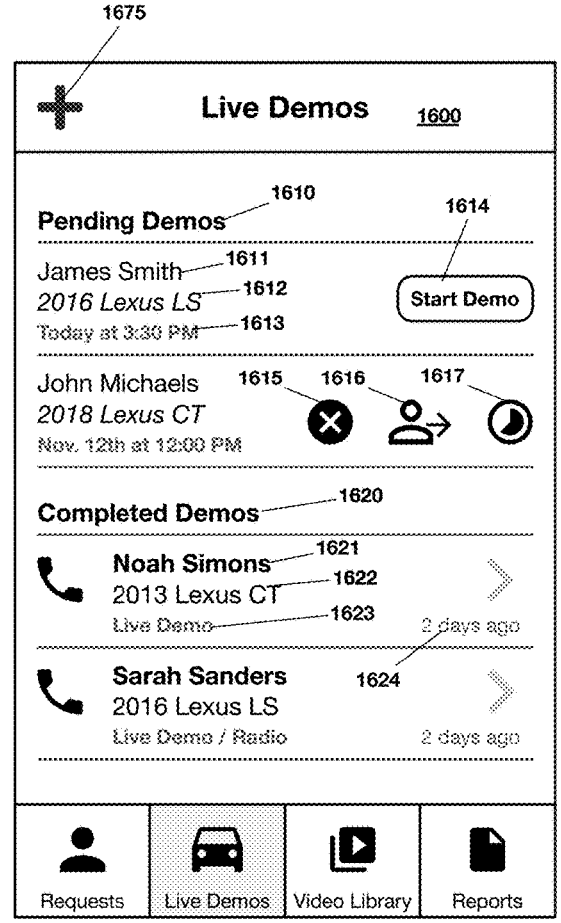
FIG. 16 shows a demos list screen 1600 of the customer support application embodiment.
Figures 17, 18:
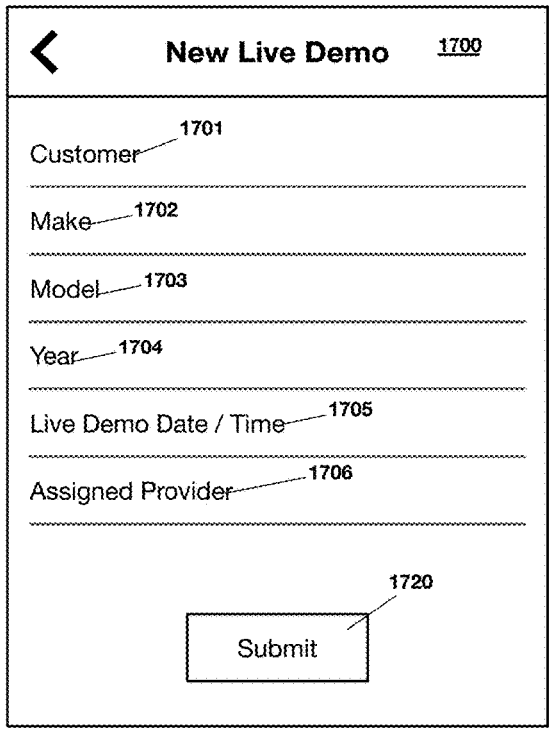
FIG. 17 shows a demo creation screen 1700 of the customer support application embodiment.
FIG. 18 shows an exemplary reports screen 1800 of the customer support application embodiment.

As shown, the provider help requests list screen 1400 may include a navigation menu 1480 comprising links to various screens of the client application, such as: a link 1481 to the provider help requests list screen 1400, a link 1482 to a demos list screen (FIG. 16 at 1600), a link 1483 to a video library screen (e.g., FIG. 11 at 1100), and link 1484 to a reports screen (FIG. 18 at 1800). The screen 1400 may also include a link 1472 to a customer search screen (FIG. 15 at 1500), which allows the provider to search through customers associated with past and/or pending help requests.

Figure 15:
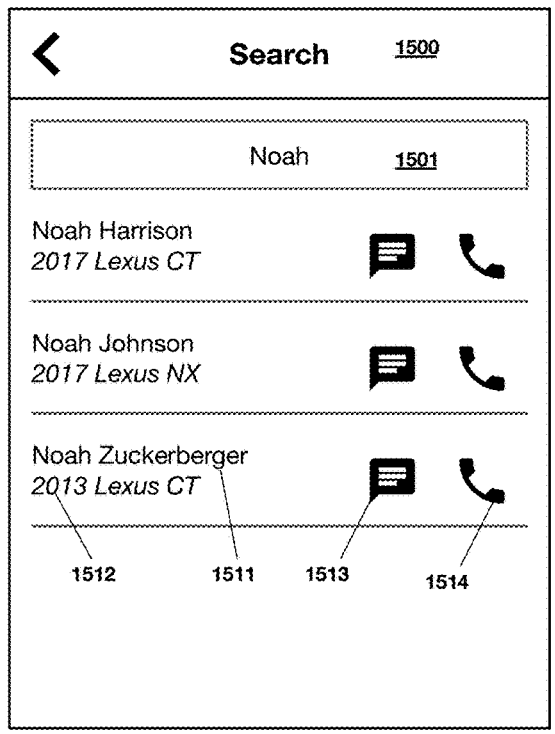
FIG. 15 shows an exemplary customer search screen 1500 of the customer support application embodiment.

Referring to FIG. 15, an exemplary customer search screen 1500 is illustrated. This screen may be accessed by, for example, selecting the search option 1472 in FIG. 14. Additionally or alternatively, this screen 1500 may be accessed by selecting the "customer" link 1701 in FIG. 17.

As shown, the customer search screen 1500 may comprise a search function 1501. Accordingly, a provider may enter search information to display search results comprising a list of one or more customers that are associated with customer information stored in the database that matches the search information. It will be appreciated that the displayed search results may comprise any customer information associated with matching customers (e.g., identification information 1511, product information 1512, etc.).

In one embodiment, a provider may select a customer from the displayed search results and a contact method prompt may be displayed. Such prompt may allow the provider to select a desired contact method for contacting the customer (e.g., live chat 1513 and/or phone/video call 1514).

Referring to FIG. 16, an exemplary demos list screen 1600 is illustrated. The demos list screen 1600 may be used by a provider to view and/or manage upcoming live demos 1610 and/or to follow up on completed live demos 1620. Generally, a demo may be categorized as a "pending demo" from the time that it is scheduled to the time that it is completed by a service provider. Once completed, the demo may be categorized as a "completed demo."

As shown, the demos list screen 1600 displays each of the pending demos 1610 assigned to a provider, along with some or all associated demo information. For example, the illustrated embodiment displays the following demo information for each pending demo 1610: a customer 1611 associated with the request (e.g., customer identification information, such as a name); product information 1612 associated with the customer (e.g., vehicle make, model and year); and a date/time 1613 when the demo is scheduled to be conducted. It will be appreciated that any customer information and/or provider information may be associated with and/or displayed for a pending demo.

The screen 1600 may also display any number of options relating to pending demos 1610. For example, an option 1614 to start a live demo with the associated customer may be provided. Upon selecting this option 1614, the application may navigate the provider to a communication screen (e.g., FIG. 9 at 900) and automatically initiate a live video call with the customer. As another example, this screen 1600 may display options to allow the provider to cancel 1615 a pending demo, transfer 1616 the pending demo to a different provider and/or reschedule 1617 the pending demo.

In one embodiment, the demos list screen 1600 may further display each of the provider's completed demos 1620 along with associated demo information. For example, the illustrated embodiment displays the following demo information for each completed demo 1620: a customer 1621 associated with the request (e.g., customer identification information, such as a name); product information 1622 associated with the customer (e.g., vehicle make, model and year); a help category 1623 associated with the demo (if applicable); and a time 1624 since the demo was completed. In certain embodiments, the provider may select one of the displayed, completed demos to view a stored video recording of the same.

Referring to FIG. 17, an exemplary new demo creation screen 1700 of a client application is illustrated. This screen 1700 allows for a demo event to be created and scheduled for a selected customer and/or assigned to one or more selected providers. The demo creation screen 1700 may be accessed by, for example, selecting button 1675 in FIG. 16.

As shown, the screen may allow a user to input or select a customer 1701 for whom a demo will be performed and any product information associated with the selected customer (e.g., vehicle make 1702, model 1703, year 1704, VIN number, etc.). The screen 1700 may also allow the user to enter a date/time 1705 of the demo and/or to assign the demo to a particular service provider 1706. Upon completing the required fields, the user may select a submit option 1720 to submit the demo and associated demo information to the server.

In one embodiment, the selected customer may be chosen using the customer search screen 1500 of FIG. 15. In this case, the relevant input fields of the demo creation screen 1700 may be automatically populated with corresponding customer information stored for the selected customer.

Referring to FIG. 18, an exemplary reports screen 1800 is illustrated. This screen may be accessed by, for example, selecting the "reports" shortcut 1484 in FIG. 14.

As shown, the reports screen 1800 may display various reports comprising information relating to a provider and/or a provider's organization according to a set or custom time frame. The reports screen 1800 may display report information comprising: a provider score 1821, average response time 1822, number of answered calls 1823, number of unanswered calls 1824, number of answered chats 1825, number of unanswered chats 1826, number of live video demos 1827 ("virtual deliveries") and/or a breakdown of question types answered 1830 (e.g., according to category).

In one embodiment, the reports screen allows reports to be created for a day 1801, the month-to-date ("MTD") 1802, the year-to-date ("YTD") 1803, and/or for a custom time period 1804. In order to create a custom report, the system may require a user to select or enter information relating to one or more of: a provider 1811, an organizational unit 1812 associated with the provider, a start date 1813, and an end date 1814.

Figure 19:
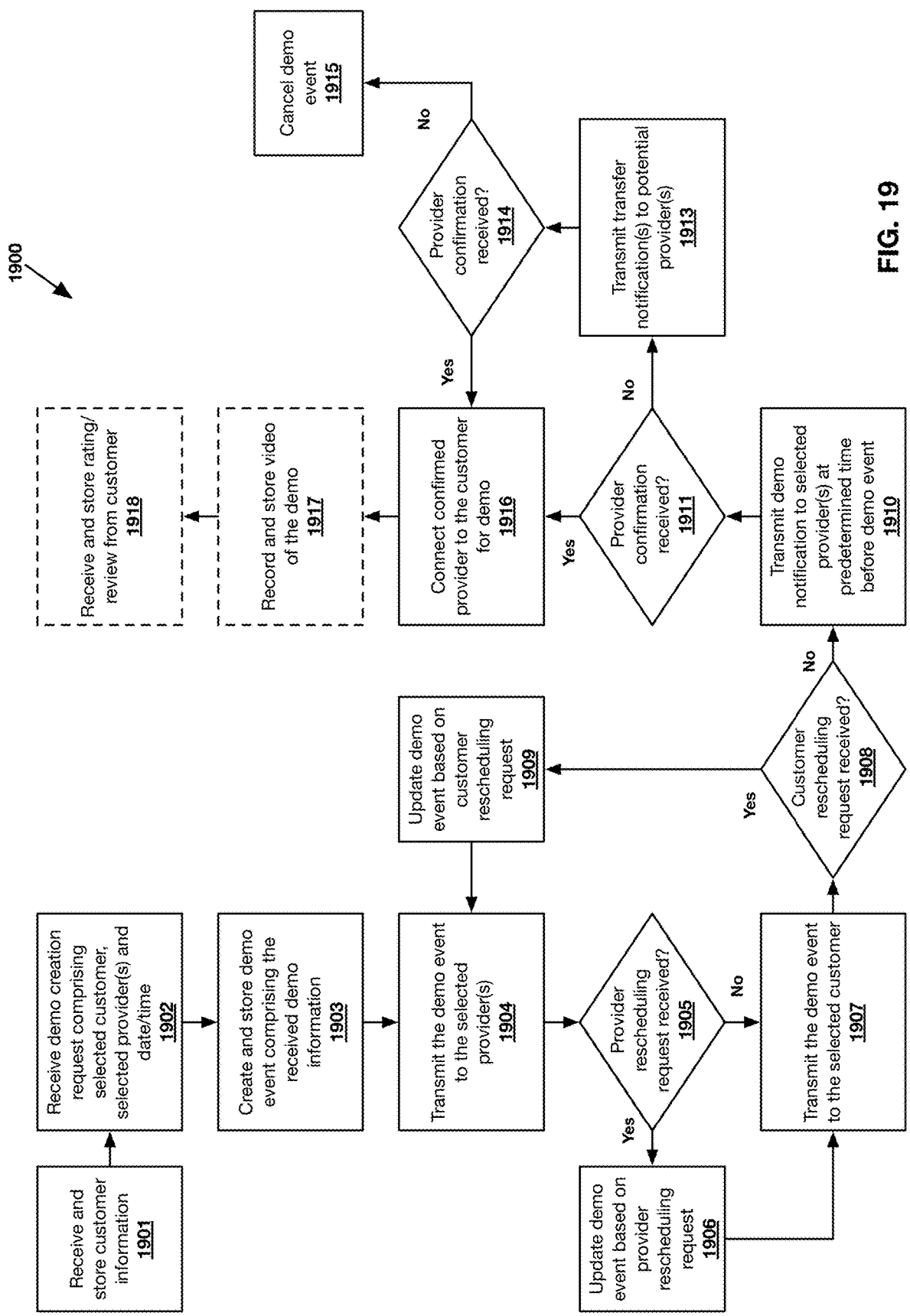
FIG. 19 shows an exemplary method 1900 of scheduling a demo according to an embodiment.

Referring to FIG. 19, an exemplary method of managing demos is illustrated. As shown, the method begins at step 1901, where the system receives customer information relating to a customer. As discussed above, exemplary customer information may include identification information, contact information, and/or product information. The system may store such information (e.g., in a database) and associate the same with a customer account corresponding to the customer.

It will be appreciated that some or all of the customer information may be manually entered into the system by the customer (e.g., via a client device) or by a provider (e.g., via a provider device). Additionally or alternatively, any of such information may be automatically received or determined by system.

At step 1902, the system receives a demo creation request comprising demo information. As discussed above, exemplary demo information may include a selected customer for whom the demo will be performed, identification information associated with the selected customer, contact information associated with the selected customer, product information associated with the selected customer, a selected date/time when the demo will be performed for the selected customer, and provider information relating to a selected provider who will perform the demo. The system may receive the demo information from a provider or admin user and the system may store such information (e.g., in a database).

At step 1903, the system may create a demo event comprising some or all of the received demo information. The system may store the demo event (e.g., in a database).

At step 1904, the system may transmit the demo event to the selected provider. For example, the system may add the demo event to the provider's list of pending demos 1610 shown in FIG. 16. The system may also transmit any number of notifications to the selected provider to notify them of the demo.

At step 1905, the system determines whether a demo rescheduling request is received from the provider (i.e., a "provider rescheduling request"). If not, the method skips to step 1907.

As discussed above, a provider may reschedule a demo by selecting an updated date/time and transmitting the same to the server. Accordingly, when a provider rescheduling request is received, the system may update the demo information associated with the demo event to include the updated date/time 1906.

In certain embodiments, the system may perform a conflicts check with the selected provider. In such case, the system may check a calendar of the selected provider to determine whether the provider has any other demos scheduled at the selected date/time (i.e., "conflicting demos"). When a conflicting demo exists, the system may notify the provider. And, in response to such notification, the provider may select an updated date/time for the demo or may simply confirm that they would like to schedule the demo at the current selected date/time.

At step 1907, the system may transmit the demo event to the selected customer. In one embodiment, the system may add the demo event to the customer's list of upcoming demos 1010 shown in FIG. 10. Additionally or alternatively, the system may send any number of notifications to the selected customer to notify them of the demo.

At step 1908, the system determines whether a demo rescheduling request is received from the customer (i.e., "customer rescheduling request"). If not, the method skips to step 1910.

As discussed above, the customer may attempt to reschedule a demo by selecting an updated date/time and transmitting the same to the server. Accordingly, when a customer rescheduling request is received, the system may update the demo information associated with the demo event to include the updated date/time 1909. The system may then return to step 1904, where the updated demo event is transmitted to the selected provider.

In one embodiment, the system may transmit a demo update notification to the selected provider (and, optionally, additional providers) when the demo event is updated at step 1909. Similarly, the system may transmit a demo update notification to the selected customer when the demo event is updated at step 1906. In one embodiment, the updated date/time of a demo event may be emphasized in the demo update notification (e.g., by showing a exclamation point or circle next to the date/time).

At step 1910, a demo notification may be sent to the selected provider at a predetermined time before a scheduled demo (e.g., 3 hours before, 2 hours before, 1 hour before, 30 minutes before, 15 minutes before, etc.). The provider may then respond to the notification to confirm that they are going to participate in the demo or they may request transfer of the scheduled demo to a different provider.

Accordingly, at step 1911, the system determines whether a provider confirmation is received from the selected provider. In some embodiments, the system may require the confirmation to be received (1) within a predetermined amount of time of transmitting the demo notification or (2) at least a certain amount time before a scheduled demo. In any event, if a provider confirmation is received, the method may skip to step 1916. Otherwise, the method continues to step 1913.

At step 1913, the system may transmit one or more transfer notifications to one or more other providers (i.e., "potential providers") alerting them to the demo event and allowing each potential provider to confirm/accept the scheduled demo (step 1913). It will be appreciated that the system may transmit transfer notifications to some or all providers. For example, the system may send a transfer notification to all service providers. As another example, the system may send a transfer notification to only those service providers who are associated with the selected customer's product or a help category that includes the selected customer's product. As yet another example, the system may transmit transfer notifications to only those service providers who are scheduled to be working at the date/time that the demo event is scheduled to occur.

In one embodiment, each transfer notification may comprise a module allowing the notification recipient to confirm the scheduled demo. Accordingly, at step 1914, the system determines whether one of the potential providers has confirmed that they will participate in the demo. That is, the system determines whether a provider confirmation has been received from one of the potential providers. If so, the method continues to step 1916. However, if a provider confirmation is not received from any of the potential providers (e.g., within a predetermined amount of time of transmitting the transfer notification or at least a certain amount time before a scheduled demo), the system may cancel the scheduled demo at step 1915 (with or without notification to the customer and/or one or more providers).

At step 1916, upon receiving a confirmation from a provider (i.e., the confirmed provider) the system connects the confirmed provider to the selected customer such that the provider may perform the demo via a live video call. At optional step 1917, the system may record the live video call (e.g., one or more live video feeds transmitted by the confirmed provider and/or the customer), store the recording (e.g., in a database) and make the recording available to the customer and/or one or more providers (e.g., via a video library). And finally, at step 1918, the system may receive and store a rating/review relating to the provider and/or the demo from the selected customer.

In an alternative embodiment (not shown), if the selected provider cannot attend the demo event, they may submit a transfer request indicating one or more potential providers who should be notified of the scheduled demo. Accordingly, the system may optionally determine whether a transfer request is received before transmitting transfer notifications at step 1913. And the system may then transmit the transfer notifications to the potential providers designated in the transfer request at step 1913. It will be appreciated that, in this embodiment, if a provider confirmation is not received from one of the designated potential providers at step 1914, the system may repeat the step by transmitting additional transfer notifications to additional potential providers.

Although not shown, the system may incorporate geolocation features to allow providers to be notified when a customer travels to one or more specific locations. In such cases, one or more locations (e.g., dealerships and/or a service locations) may be input into the system and stored such that they are continuously monitored (i.e., such locations may be geo-fenced). The system may then track the real-time location of any number of customers (e.g., via a GPS, Wi-Fi or cellular) to determine when a customer travels to a monitored location. Upon such event, the system may transmit a notification to any number of providers (e.g., providers located at the customer's current location). Such notification may include, for example, identification/contact information (e.g., name, phone number, address, etc.) and/or product information (e.g., make, model, year, etc.) associated with the customer. In this way, the system may allow the providers to greet the customer upon their arrival and more efficiently provide any desired or required support.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A method comprising:
   storing, by a server, in a database, a plurality of customers, each customer associated with customer information;
   storing, by the server, in the database, a plurality of providers, each provider associated with provider information;
   receiving, by the server, a demo creation request associated with demo information comprising:
      a selected customer from the plurality of customers;
      a selected provider from the plurality of providers; and
      a selected date/time;
   creating, by the server, a demo event comprising the demo information;
   storing, by the server, in the database, the demo event;
   transmitting, by the server, to a provider device associated with the selected provider, the demo event;
   transmitting, by the server, to a client device associated with the selected customer, the demo event;
   transmitting, by the server, to the provider device, a demo notification before the selected date/time;
   receiving, by the server, from a confirmed provider, a demo confirmation,
      wherein the confirmed provider comprises the selected provider or a different provider of the plurality of providers; and
   connecting, by the server, the provider device or another provider device associated with the confirmed provider to the client device or another client device associated with the selected customer at the selected date/time to thereby facilitate a live video call between the confirmed provider and the selected customer.

2. A method according to claim 1, further comprising:
   receiving, by the server, from the provider device, a first rescheduling request,
      wherein the first rescheduling request comprises an updated date/time; and
   updating, by the server, the selected date/time associated with the demo event to the updated date/time before said transmitting the demo event to the client device.

3. A method according to claim 2, further comprising:
upon said transmitting the demo event to the client device, receiving, from the client device, a second rescheduling request,
wherein the second rescheduling request comprises a second updated date/time;
updating, by the server, the selected date/time associated with the demo event to the second updated date/time; and
providing, by the server, the demo event to the provider device.

4. A method according to claim 1, further comprising:
determining that the demo confirmation has not been received from the selected provider; and
transmitting, by the server, a transfer notification to one or more potential providers of the plurality of providers,
wherein the confirmed provider is one of the potential providers.

5. A method according to claim 4, wherein the demo confirmation is not received from the selected provider within at least a predetermined amount of time before the selected date/time.

6. A method according to claim 4, wherein the one or more potential providers comprises each of the plurality of providers.

7. A method according to claim 4, wherein the transfer notification comprises some or all of the demo information.

8. A method according to claim 1, further comprising providing, by the server, to the confirmed provider, the customer information associated with the selected customer.

9. A method according to claim 1, wherein the confirmed provider is the selected provider.

10. A method according to claim 9, further comprising:
receiving, by the server, from the provider device, a live video feed captured by a camera of the provider device; and
transmitting, by the server, to the client device, the live video feed.

11. A method according to claim 10, further comprising:
recording, by the server, the live video feed;
storing, by the server, in the database, the recorded live video feed; and
providing, by the server, to the client device, the recorded live video feed.

12. A method according to claim 1, wherein the customer information associated with the selected customer comprises identification information, contact information and a product that is itself associated with product information.

13. A method according to claim 12, wherein the product is a vehicle and the associated product information comprises one or more of a make, a model, a year and a vehicle identification number ("VIN") of the vehicle.

14. A method according to claim 1, wherein the provider information associated with the selected provider comprises one or more of: a name of the selected provider, an organization with which selected provider is associated, and a location at which the selected provider provides support services.

15. A method according to claim 1, further comprising receiving, by the server, from the client device, a rating relating to the confirmed provider.

16. A system comprising:
a plurality of client devices, each device associated with one of a plurality of customers;
a plurality of provider devices, each device associated with one of a plurality of providers; and
a server in communication with the plurality of client devices and the plurality of provider devices via a network, the server comprising:
a memory storing:
customer information associated with each of the plurality of customers; and
provider information associated with each of the plurality of providers; and
a processor adapted to:
receive a demo creation request associated with demo information comprising:
a selected customer from the plurality of customers;
a selected provider from the plurality of providers; and
a selected date/time;
create a demo event comprising the demo information;
transmit the demo event to a selected provider device associated with the selected provider;
transmit the demo event to a selected client device associated with the selected customer;
transmit a demo notification to the selected provider device before the selected date/time;
receive a demo confirmation from the selected provider device; and
connect the selected provider device to the selected client device via the network to thereby facilitate a live video call between the selected provider and the selected customer.

17. A system according to claim 16, wherein the processor is further adapted to:
receive a first rescheduling request from the selected provider device,
wherein the first rescheduling request comprises an updated date/time; and
update the selected date/time associated with the demo event to the updated date/time before said transmitting the demo event to the selected client device.

18. A system according to claim 17, wherein the processor is further adapted to:
receive a second rescheduling request from the selected client device,
wherein the second rescheduling request comprises a second updated date/time;
update the selected date/time associated with the demo event to the second updated date/time; and
provide the demo event to the selected provider device.

19. A system according to claim 16, wherein the processor is further adapted to:
receive, from the selected provider device, a video feed captured by a camera of the selected provider device; and
transmit the video feed to the selected client device.

20. A system according to claim 19, wherein the processor is further adapted to:
record the video feed; and
provide the recorded video feed to the client device.

* * * * *